(12) United States Patent
Murakami

(10) Patent No.: US 8,369,097 B2
(45) Date of Patent: Feb. 5, 2013

(54) ELECTRONIC APPARATUS

(75) Inventor: Mitsuhiro Murakami, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/109,899

(22) Filed: May 17, 2011

(65) Prior Publication Data

US 2011/0310572 A1    Dec. 22, 2011

(30) Foreign Application Priority Data

Jun. 18, 2010    (JP) .................................. 2010-139790

(51) Int. Cl.
*H05K 5/00* (2006.01)
(52) U.S. Cl. ........................ 361/755; 361/752; 361/816
(58) Field of Classification Search .................. 361/755, 361/681, 683, 724–727, 679.55, 679.57, 361/752, 816, 818; 455/575.1–575.4, 575.7, 455/550, 556, 558; 16/366, 354, 334–336, 16/681, 683; 343/702, 742, 866, 867, 872, 343/882

See application file for complete search history.

(56) References Cited

U.S. PATENT DOCUMENTS

| | | | | |
|---|---|---|---|---|
| 7,606,605 B2 * | 10/2009 | Lee et al. | .................. | 455/575.3 |
| 7,637,813 B2 * | 12/2009 | Katayama et al. | .............. | 463/31 |
| 7,785,199 B2 * | 8/2010 | Nishimura et al. | ............. | 463/31 |
| 7,797,795 B2 * | 9/2010 | Maatta et al. | .................. | 16/250 |
| 7,907,415 B2 | 3/2011 | Ueyama | | |
| 7,991,441 B2 * | 8/2011 | Kim et al. | .................. | 455/575.3 |
| 8,005,522 B2 * | 8/2011 | Ou | ............. | 455/575.3 |
| 2004/0209641 A1 * | 10/2004 | Hong | ......................... | 455/550.1 |
| 2006/0160585 A1 | 7/2006 | Miyagawa et al. | | |
| 2008/0102888 A1 * | 5/2008 | Sellgren et al. | ............ | 455/556.1 |
| 2008/0316113 A1 * | 12/2008 | Nakasato et al. | ............. | 343/702 |
| 2009/0170570 A1 * | 7/2009 | Uejima et al. | ............. | 455/575.3 |
| 2010/0149764 A1 | 6/2010 | Ueyama | | |

FOREIGN PATENT DOCUMENTS

| | | |
|---|---|---|
| JP | 2002-198849 | 7/2002 |
| JP | 2002-312063 | 10/2002 |
| JP | 2005-318249 | 11/2005 |
| JP | 2006-229319 | 8/2006 |
| JP | 2007-032764 | 2/2007 |
| JP | 2007-053718 | 3/2007 |
| JP | 2008-075747 | 4/2008 |
| JP | 2010-011405 | 1/2010 |

OTHER PUBLICATIONS

Notice of Reasons for Rejection mailed by the Japan Patent Office on Aug. 2, 2011 in corresponding Japanese patent app. No. 2010-139790 in 4 pages.
Notice of Reasons for Rejection mailed by the Japan Patent Office on Oct. 18, 2011 in corresponding Japanese patent app. No. 2010-139790 in 5 pages.

* cited by examiner

*Primary Examiner* — Hung S Bui
(74) *Attorney, Agent, or Firm* — Knobbe, Martens, Olson & Bear LLP

(57) ABSTRACT

According to one embodiment, an electronic apparatus includes a first housing, a second housing, a third housing between the first housing and the second housing, the third housing being rotatably connected to the first housing and the second housing, and an antenna in the third housing.

20 Claims, 9 Drawing Sheets

ELECTRONIC APPARATUS

CROSS-REFERENCE TO RELATED APPLICATIONS

This application is based upon and claims the benefit of priority from Japanese Patent Application No. 2010-139790, filed Jun. 18, 2010; the entire contents of which are incorporated herein by reference.

FIELD

Embodiments described herein relate generally to an electronic apparatus including an antenna.

BACKGROUND

Some electronic apparatuses include antennas for wireless connection.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises a first housing, a second housing, a third housing between the first housing and the second housing the third housing being rotatably connected to the first housing and the second housing, and an antenna in the third housing.

Hereinafter, exemplary embodiments will be described with reference to the accompanying drawings.

First Embodiment

FIGS. 1 to 9 show an electronic apparatus 1 according to a first embodiment. The electronic apparatus 1 is, for example, a notebook personal computer (hereinafter, referred to as a notebook PC). In addition, the electronic apparatus 1 has a relatively small size and is a hand-held type that can be used while being held by hands. Electronic apparatuses to which the first embodiment can be applied are not limited thereto. The first embodiment can be widely applied to various kinds of electronic apparatuses including, for example, a relatively large notebook PC, a personal digital assistant (PDA), and a game machine.

Figure 1:
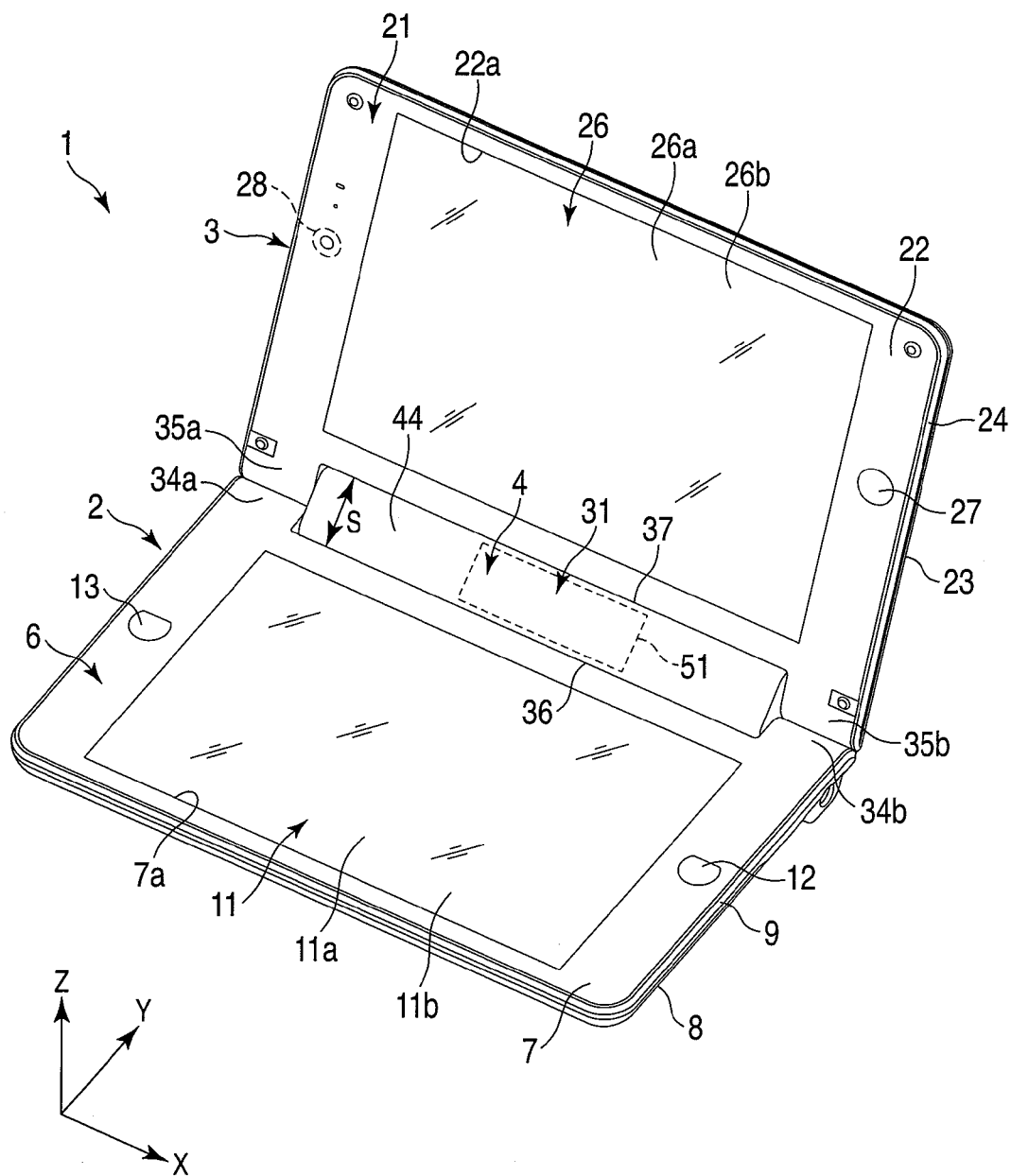
FIG. 1 is an exemplary perspective view illustrating an example of an electronic apparatus according to a first embodiment.

As shown in FIG. 1, the electronic apparatus 1 includes a first main portion 2, a second main portion 3, and a connection portion 4. In this embodiment, each of the first main portion 2 and the second main portion 3 is a display unit including a display panel. The connection portion 4 connects the first main portion 2 and the second main portion 3 such that they can be rotated relative to each other.

The first main portion 2 includes a first housing 6. The first housing 6 is made of metal, for example. The first housing 6 has a flat box shape including a first front wall 7, a first rear wall 8, and a first circumferential wall 9. The first front wall 7 is an example of a "first wall of the first housing." The first rear wall 8 is an example of a "second wall of the first housing."

The first rear wall 8 faces a desk surface when the electronic apparatus 1 is placed on the desk. The first rear wall 8 is substantially parallel to the desk surface. The first rear wall 8 is opposite to the first front wall 7 in the first housing 6. The first front wall 7 extends substantially parallel to the first rear wall 8 with a space therebetween. The first circumferential wall 9 rises with respect to the first front wall 7 and the first rear wall 8 and connects the edge portion of the first front wall 7 and the edge portion of the first rear wall 8.

As shown in FIG. 1, the first housing 6 contains a first display panel 11. The first display panel 11 is, for example, a liquid crystal display (LCD) panel. However, the first display panel 11 is not limited thereto, but it may be a plasma display panel, an organic EL display panel, or other display panels.

The first display panel 11 includes a display screen 11a that displays a video or an image thereon. In addition, the first display panel 11 is provided with a touch panel 11b. The first display panel 11 is provided along the inner surface of the first front wall 7. The first front wall 7 includes a first opening portion 7a through which the display screen 11a and the touch panel 11b are exposed to the outside. A user can view a video or an image through the first opening portion 7a or input via the touch panel 11b.

As shown in FIG. 1, the first front wall 7 includes a plurality of buttons 12 and 13 for operating the electronic apparatus 1. The home button 12 is provided on the right side of the first display panel 11. When a user manipulates the home button 12, a representative application (home application) of the electronic apparatus 1 starts up.

Figure 6:
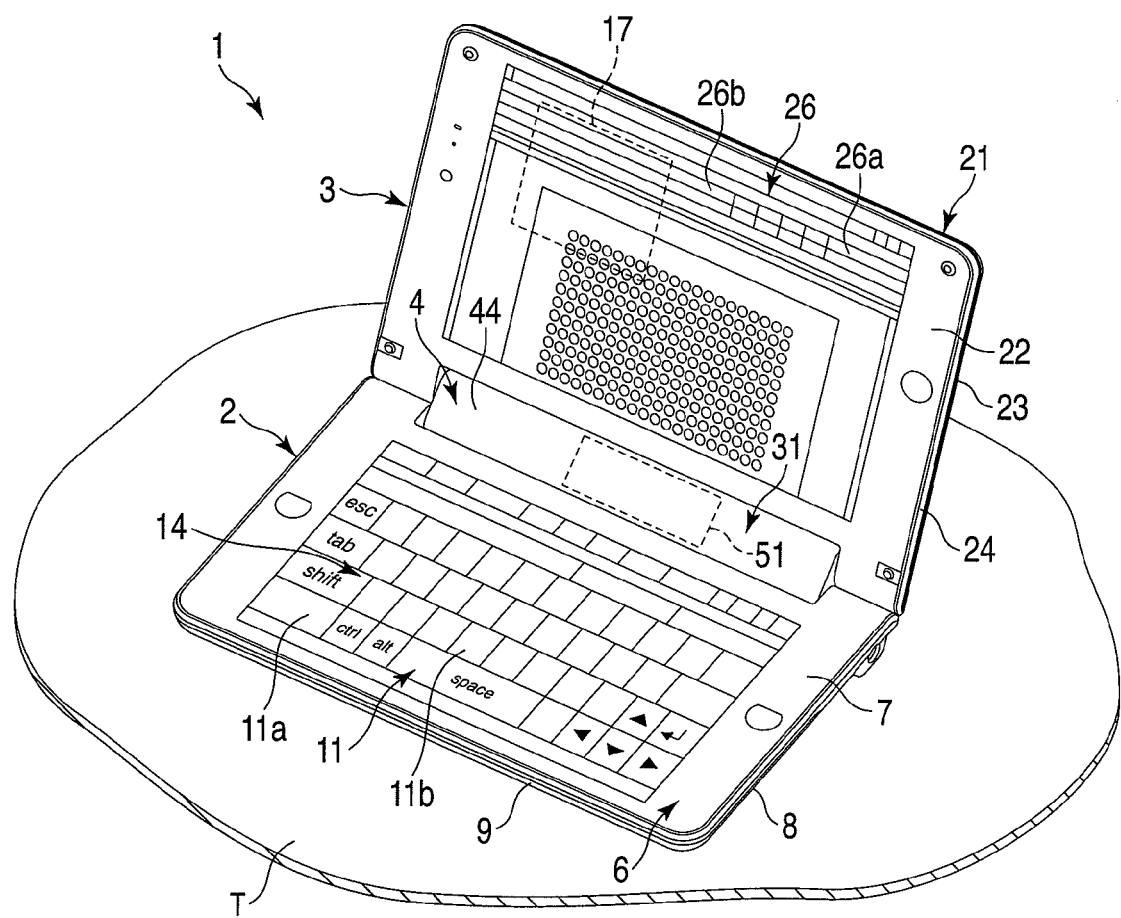
FIG. 6 is an exemplary perspective view illustrating an example of a use pattern of the electronic apparatus shown in FIG. 1.

The keyboard button 13 is provided on the left side of the first display panel 11. When a user manipulates the keyboard button 13, a first keyboard 14 shown in FIG. 6 is displayed on the first display panel 11. The first keyboard 14 includes, for example, an ASCII array or a JIS array and is displayed substantially over the entire region of the first display panel 11 in the longitudinal direction. A user can place the electronic apparatus 1, for example, on a desk surface T for use.

Figure 7:
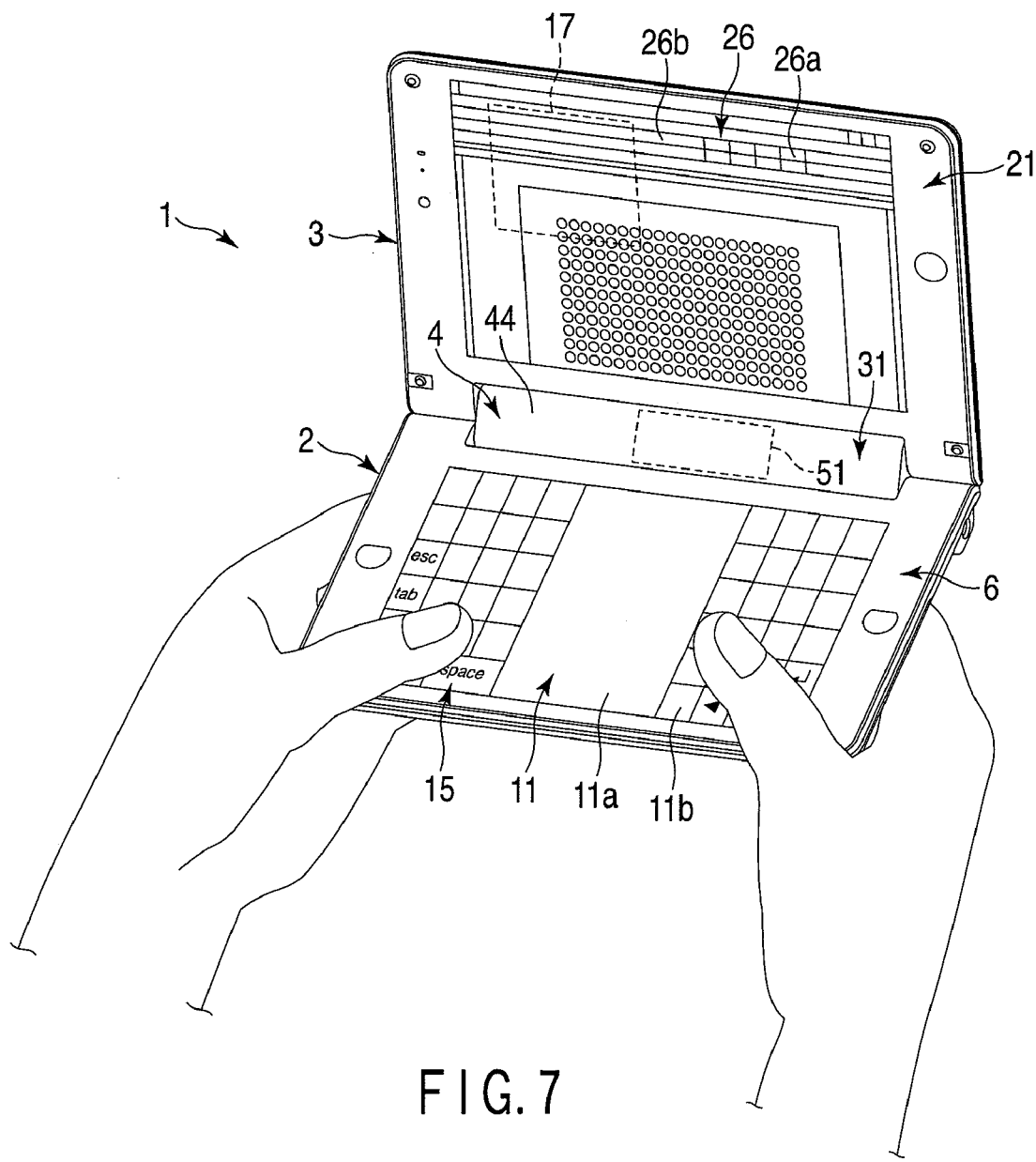
FIG. 7 is an exemplary perspective view illustrating an example of the use pattern of the electronic apparatus shown in FIG. 1.

The electronic apparatus 1 includes an application that displays, for example, the image of a second keyboard 15 shown in FIG. 7 on the first display panel. Keys of the second keyboard 15 are displayed only at the left and right end portions of the first display panel 11. A user can use the electronic apparatus 1 with the hands holding the electronic apparatus 1. The switching between the first keyboard 14 and the second keyboard 15 can be controlled by a control portion 17, which will be described below.

Figure 3:
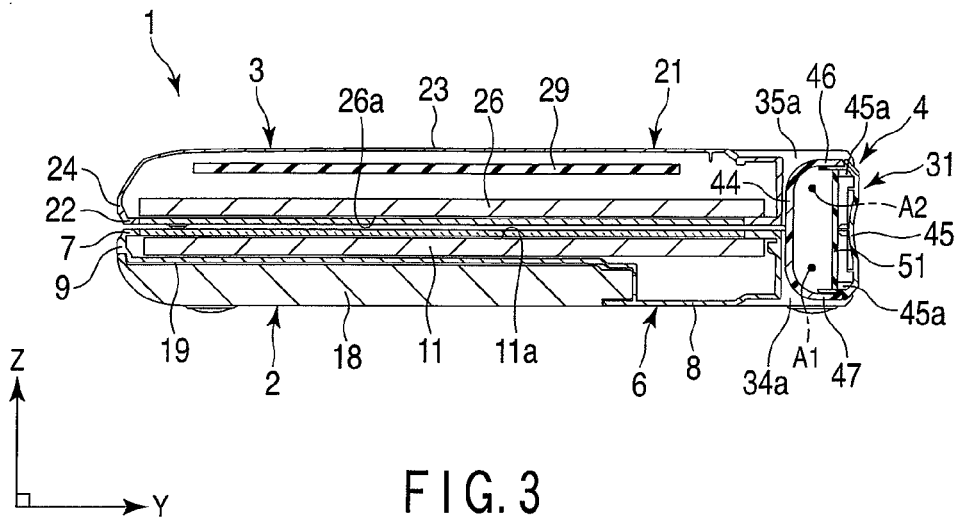
FIG. 3 is an exemplary cross-sectional view illustrating a first position of the electronic apparatus shown in FIG. 1.

As shown in FIG. 3, a battery pack 18 is detachably attached to the first housing 6. Specifically, the first rear wall 8 includes a concave portion 19 greatly recessed toward the inside of the first housing 6. The battery 18 is attached to the concave portion 19. In other words, the first rear wall 8 partitions the concave portion 19 and the inner space of the first housing 6.

As shown in FIG. 1, the second main portion 3 includes a second housing 21. The second housing 21 is made of metal, for example. The second housing 21 has a flat box shape including a second front wall 22, a second rear wall 23, and a second circumferential wall 24. The second front wall 22 is an example of a "first wall of the second housing." The second rear wall 23 is an example of a "second wall of the second housing." For example, the size, outward shape, and thickness of the second housing 21 are substantially the same as those of the first housing 6.

The second front wall 22 faces the first front wall 7 of the first housing 6 when the second housing 21 is folded onto the first housing 6. The second rear wall 23 is opposite to the second front wall 22 in the second housing 21. The second rear wall 23 extends substantially parallel to the second front wall 22 with a space therebetween. The second circumferential wall 24 rises with respect to the second front wall 22 and the second rear wall 23, and connects the edge portion of the second front wall 22 and the edge portion of the second rear wall 23.

As shown in FIG. 1, the second housing 21 contains a second display panel 26. The second display panel 26 is for example, a liquid crystal display (LCD) panel. However, the second display panel 26 is not limited thereto, but it may be a plasma display panel, an organic EL display panel, or other display panels.

The second display panel 26 includes a display screen 26a that displays a video or an image. In addition, the second display panel 26 is provided with a touch panel 26b. The second display panel 26 is provided along the inner surface of the second front wall 22. The second front wall 22 includes a second opening portion 22a through which the display screen 26a and the touch panel 26b are exposed to the outside. A user can view a video or an image through the second opening portion 22a or input via the touch panel 26b.

Both the first display panel 11 and the second display panel 26 may not necessarily include the touch panel, but only one of the first display panel 11 and the second display panel 26 may include the touch panel. Neither the first display panel 11 nor the second display panel 26 may include the touch panel.

The second front wall 22 includes a button 27 for operating the electronic apparatus 1. The power button 27 is provided on the right side of the second display panel 26. A camera 28 is provided on the left side of the second display panel 26.

As shown in FIG. 3, the second housing 21 contains a circuit board 29 which is a main board. The circuit hoard 29 is provided along the inner surface of the second rear wall 23. The circuit board 29 is opposite to the second display panel 26 in the second housing 21.

The second housing 21 further contains, for example, a storage device, a cooling fan, and a heat sink (not shown). In this way, the weights of the first main portion 2 and the second main portion 3 are adjusted so as to be substantially equal to each other. In addition, the first main portion 2 is slightly heavier than the second main portion 3 such that the second main portion 3 does not fall on its back when the second main portion 3 is opened with respect to the first main portion 2.

As shown in FIG. 1, the connection portion 4 includes a third housing 31 and a biaxial hinge mechanism 32 attached to the third housing 31. The third housing 31 is between the first housing 6 and the second housing 21. The third housing 31 is a so-called intermediate piece. The third housing 31 is made of plastic, for example. The third housing 31 is rotatably connected to the first housing 6 and the second housing 21. The third housing 31 serves as a wedge and the second housing 21 can be opened or closed with respect to the first housing 6 at an angle of, for example, 0° to 180°.

Specifically, a pair of first projections 34a and 34b protruding toward the second housing 21 is provided at both end portions of the first housing 6 in the longitudinal direction. A pair of second projections 35a and 35b protruding toward the first housing 6 is provided at both end portions of the second housing 21 in the longitudinal direction. In other words, the first housing 6 includes a first concave portion 36 between the pair of first projections 34a and 34b. The second housing 21 includes a second concave portion 37 between the pair of second projections 35a and 35b.

Figure 2:
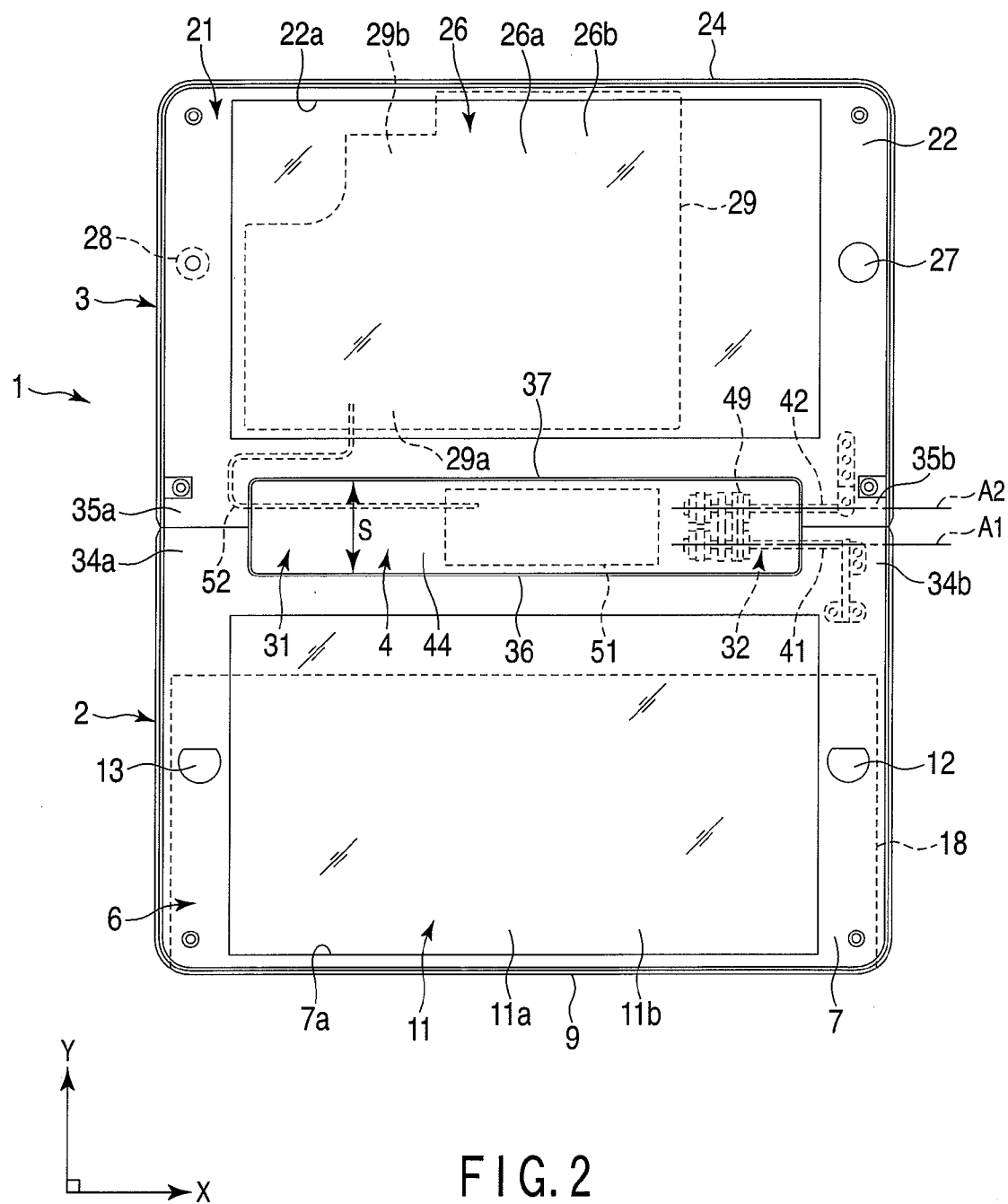
FIG. 2 is an exemplary plan view illustrating the electronic apparatus shown in FIG. 1.

As shown in FIG. 2, the first projections 34a and 34b and the second projections 35a and 35b face each other. There is little gap between the left first projection 34a and the left second projection 35a. In addition, there is little gap between the right first projection 34b and the right second projection 35b. The first concave portion 36 and the second concave portion 37 face each other. There is a relatively large space S between the first concave portion 36 and the second concave portion 37.

As shown in FIGS. 1 and 2, the third housing 31 has an elongated shape and is disposed in the space S which is between the first concave portion 36 and the second concave portion 37. That is, the third housing 31 is between the pair of first projections 34a and 34b and between the pair of second projections 35a and 35b.

As shown in FIG. 2, the biaxial hinge mechanism 32 includes a first hinge 41 and a second hinge 42 which are attached to the third housing 31. The first hinge 41 and the second hinge 42 are substantially parallel to each other.

The first hinge 41 extends from the inside of the third housing 31 to the inside of the first housing 6 and is attached to the first housing 6. The first hinge 41 connects the third housing 31 to the first housing 6 such that the third housing 31 can be rotated with respect to the first housing 6. The second hinge 42 extends from the inside of the third housing 31 to the inside of the second housing 21 and is attached to the second housing 21. The second hinge 42 connects the third housing 31 to the second housing 21 such that the third housing 31 can be rotated with respect to the second housing 21. In this way, the second housing 21 can be rotated with respect to the first housing 6.

The electronic apparatus 1 can be displaced among a first position, a second position, and a third position, which will be described below. FIG. 3 shows the first position. At the first position, the second housing 21 is folded onto the first housing 6, and the first position is a so-called closed position. At the first position, the second front wall 22 the second housing 21 faces the first front wall 7 of the first housing 6.

Next, the X direction, the Y direction, and the Z direction are defined. As shown in FIG. 1, the X direction and the Y direction are aligned with the first front wall 7 of the first housing 6. The X direction is the longitudinal direction of the first housing 6. The Y direction is the lateral direction of the first housing 6 and is substantially orthogonal to the X direction. The Z direction is the thickness direction of the first housing 6 and is substantially orthogonal to the X direction and the Y direction.

As shown in FIG. 3, the third housing 31 is substantially rectangular in a cross-section. At the first position, the longitudinal direction of the third housing 31 in a cross-sectional view is substantially aligned with the Z direction. That is, the third housing 31 rises with respect to the first housing 6.

The third housing 31 includes a third front wall 44 and a third rear wall 45. The third front wall 44 is an example of a "first wall of the third housing." The third rear wall 45 is an example of a "second wall of the third housing." Each of the third front wall 44 and the third rear wall 45 extends in the longitudinal direction of the third housing 31 in a cross-sectional view and rises at the first position. The third rear wall 45 is opposite to the third front wall 44 in the third housing 31 and is substantially parallel to the third front wall 44 with a space interposed therebetween.

The third housing 31 further includes a first side wall 46 and a second side wall 47. Each of the first side wall 46 and the second side wall 47 extends in the lateral direction of the third housing 31 in a cross-sectional view and is substantially horizontal at the first position. The first side wall 46 and the second side wall 47 connect the edge portion of the third front wall 44 and the edge portion of the third rear wall 45.

As shown in FIG. 3, at the first position, the third front wall 44 faces in a direction of the first display panel 11, the second display panel 26, and the circuit board 29. The third rear wall 45 faces the opposite side of the first display panel 11, the second display panel 26, and the circuit board 29, that is, faces the outside of the electronic apparatus 1. The term "facing the outside of the electronic apparatus 1" means appearing outside the electronic apparatus 1.

Figure 4:
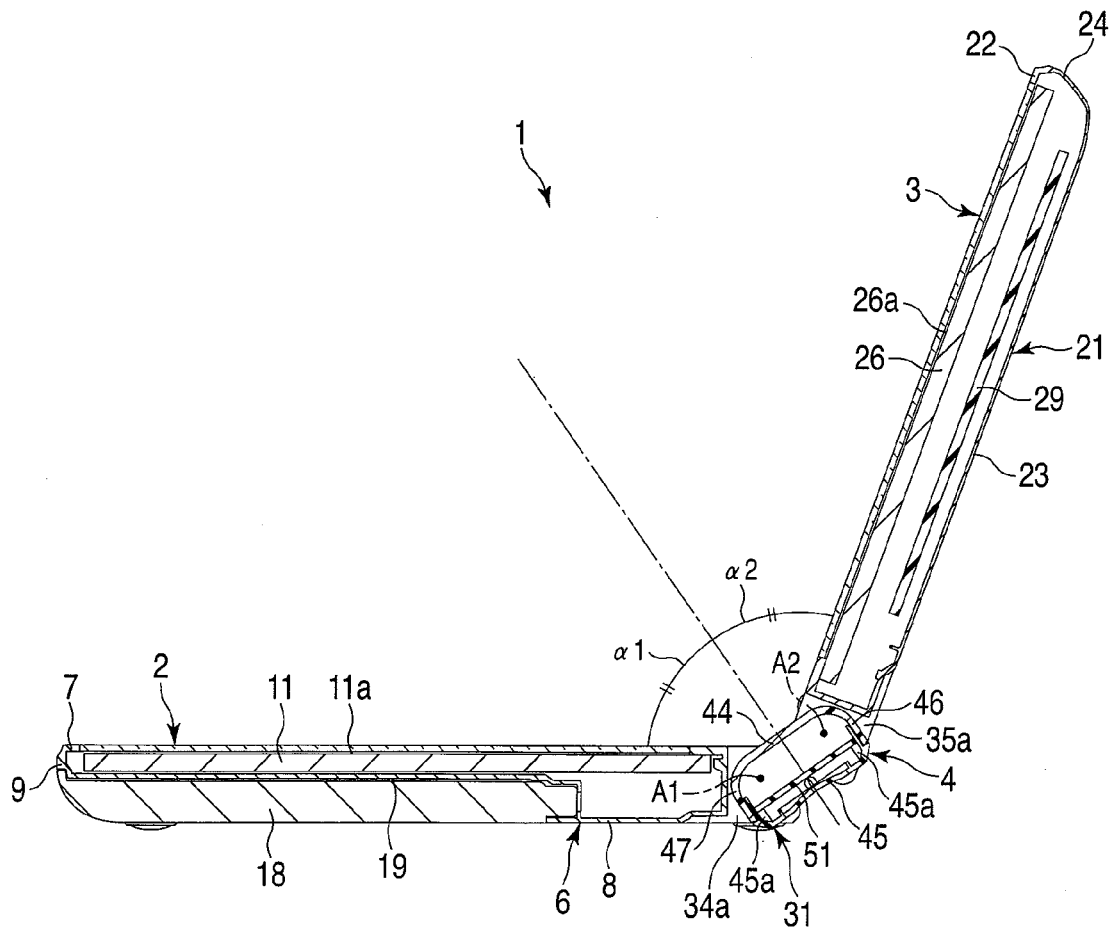
FIG. 4 is an exemplary cross-sectional view illustrating a second position of the electronic apparatus shown in FIG. 1.

FIG. 4 shows the second position. At the second position, the second housing 21 rises with respect to the first housing 6. As shown in FIG. 2, the first hinge 41 and the second hinge 42 include a link mechanism 49 that operatively associates the rotation of the first and second hinges 41 and 42.

The link mechanism 49 makes a rotation angle α1 of the third housing 31 with respect to the first housing 6 constantly equal to a rotation angle α2 of the second housing 21 with respect to the third housing 31. Therefore, as shown in FIG. 4, at the second position, the third housing 31 is raised with respect to the first housing 6 and the third housing 31 is raised with respect to the second housing 21.

Figure 5:
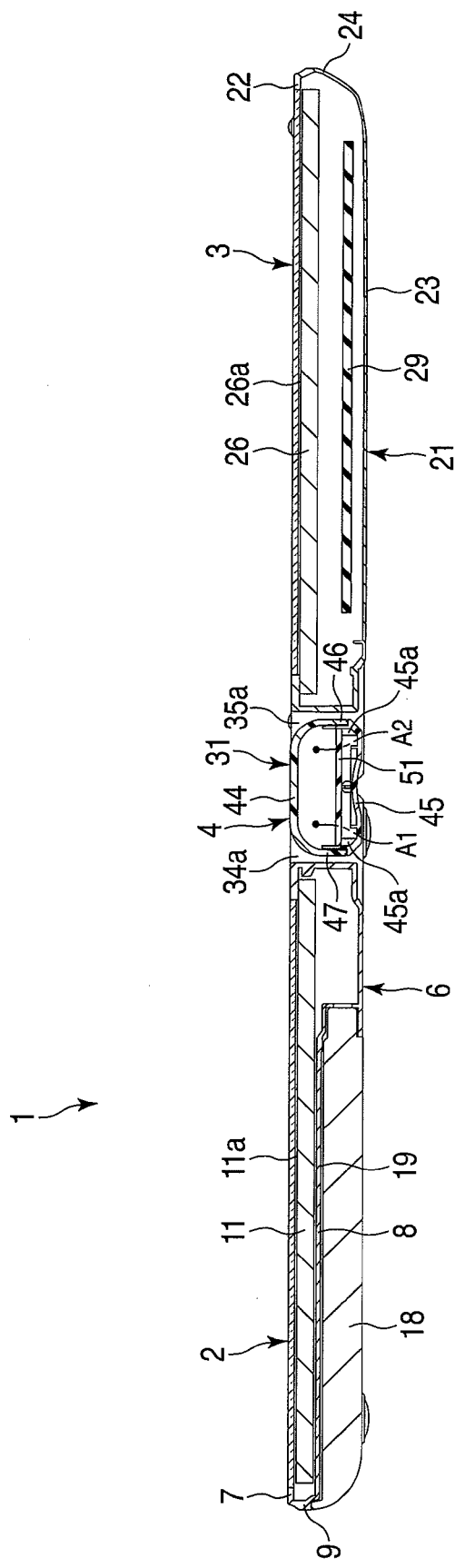
FIG. 5 is an exemplary cross-sectional view illustrating a third position of the electronic apparatus shown in FIG. 1.

FIG. 5 shows the third position. At the third position, the second housing 21 is opened at an angle of substantially 180° with respect to the first housing 6. At the third position, the third housing 31 is opened at an angle of substantially 90° with respect to the first housing 6 and the second housing 21 is opened at an angle of substantially 90° with respect to the third housing 31. That is, the third housing 31 that rises at the first position lies at the third position.

In this way, in the electronic apparatus 1, the first housing 6, the second housing 21, and the third housing 31 are substantially horizontal relative to each other at the third position. Each of the third front wall 44 and the third rear wall 45 extends substantially horizontal. The first housing 6, the second housing 21, and the third housing 31 have substantially the same thickness.

The third front wall 44 is substantially at the same height as the first front wall 7 of the first housing 6 and the second front wall 22 of the second housing 21, and the third front wall 44, the first front wall 7, and the second front wall 22 extend to be substantially flush with one another. The third rear wall 45 is substantially at the same height as the first rear wall 8 of the first housing 6 and the second rear wall 23 of the second housing 21, and the third rear wall 45, the first rear wall 8, and the second rear wall 23 extend to be substantially flush with one another. The third rear wall 45 is opposite to the display screen 11a of the first display panel 11 and the display screen 26a of the second display panel 26.

The electronic apparatus 1 according to this embodiment includes a stopper that restricts the rotation of the second housing 21 such that the second housing 21 is not rotated at an angle of more than 180° with respect to the first housing 6. Alternatively, the electronic apparatus 1 may be configured such that, for example, the second housing 21 can be rotated up to 360° with respect to the first housing 6.

As shown in FIG. 2, the third housing 31 contains an antenna 51 for wireless communication. The antenna 51 is, for example, an antenna for a wireless LAN (W-LAN) or a third-generation mobile communication system (3G) antenna, but other antennas may be used. The antenna 51 includes, for example, a substantially rectangular board.

As shown in FIG. 3, the antenna 51 is attached to the wall of the third housing 31 that rises and faces the outside of the electronic apparatus 1 when the second housing 21 is folded onto the first housing 6, that is, the third rear wall 45. Specifically, ribs 45a are provided on the third rear wall 45. The antenna 51 is attached to the ribs 45a. The antenna 51 is provided along the third rear wall 45. The third rear wall 45 is furthest away from the first display panel 11, the second display panel 26, and the circuit board 29 in the third housing 31. The antenna 51 is closer to the third rear wall 45 than to the third front wall 44.

As shown in FIG. 3, at the first position, the antenna 51 rises substantially parallel to the third rear wall 45. In this way, a relatively long distance is ensured between the antenna 51 and all of the first display panel 11, the second display panel 26, and the circuit board 29. The antenna 51 is closer to the third rear wall 45 than to an axis line A1 of the first hinge 41 and an axis line A2 of the second hinge 42.

As shown in FIG. 4, at the second position, the third housing 31 is forcibly rotated with respect to the first housing 6 and the second housing 21 by the link mechanism 49. As the angle between the second housing 21 and the first housing 6 increases, the distance between the antenna 51 and the first display panel 11, the second display panel 26, and circuit board 29 increases.

That is, at the second position or the third position where the antenna is actually used, the distance between the antenna 51 and the first display panel 11, the second display panel 26, and the circuit board 29 is more than that of the first position. That is, the antenna 51 is less likely to be affected by unnecessary radiation from the first display panel 11, the second display panel 26, and the circuit board 29.

As shown in FIG. 5, at the third position, the antenna 51 lies. The antenna 51 is at the position where it is at a recessed position from the first display panel 11 and the second display panel 26 toward the third rear wall 45. In this way, a relatively long distance is ensured between the antenna 51 and the first display panel 11, the second display panel 26, and the circuit board 29.

As shown in FIG. 2, the antenna 51 includes a cable 52 extending from the inside of the third housing 31 to the inside of the second housing 21. The cable 52 is connected to the circuit board 29. The circuit board 29 includes a first end portion 29a close to the third housing 31 and a second end portion 29b opposite to the first end portion 29a. The cable 52 is connected to, for example, a connector at the first end portion 29a of the circuit board 29.

Figure 8:
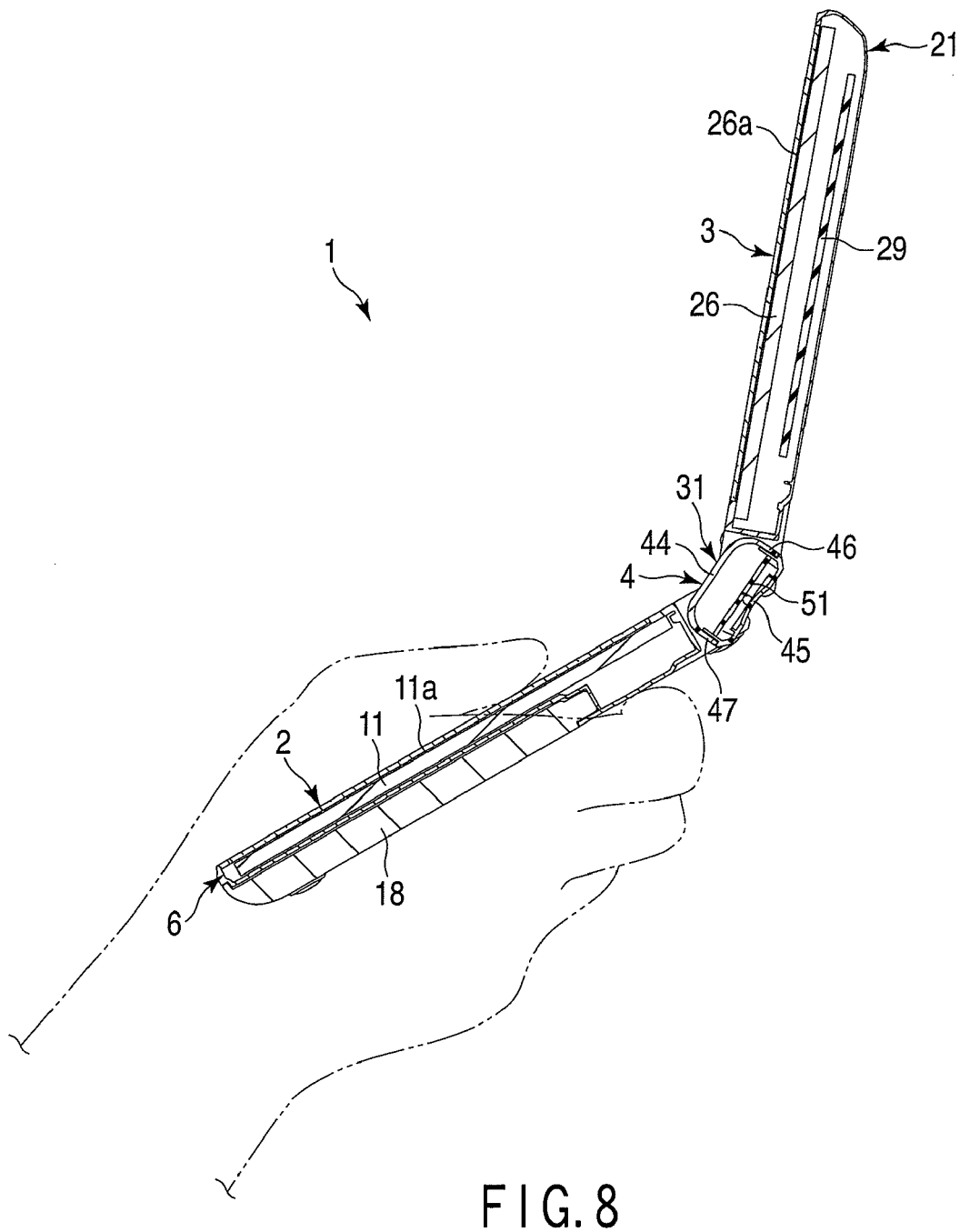
FIG. 8 is an exemplary cross-sectional view illustrating an example of the use pattern of the electronic apparatus shown in FIG. 1.

The electronic apparatus 1 includes the control portion 17 that can switch the electronic apparatus 1 between a first use pattern and a second use pattern. The control portion 17 is implemented by, for example, the entire or part of the circuit board 29. In the first use pattern, for example, the first housing 6 and the second housing 21 are opened in the vertical direction for use, as shown in FIGS. 6, and 8. The electronic apparatus 1 may be used on the desk surface T, or may be used with being held by the hands.

Figure 9:
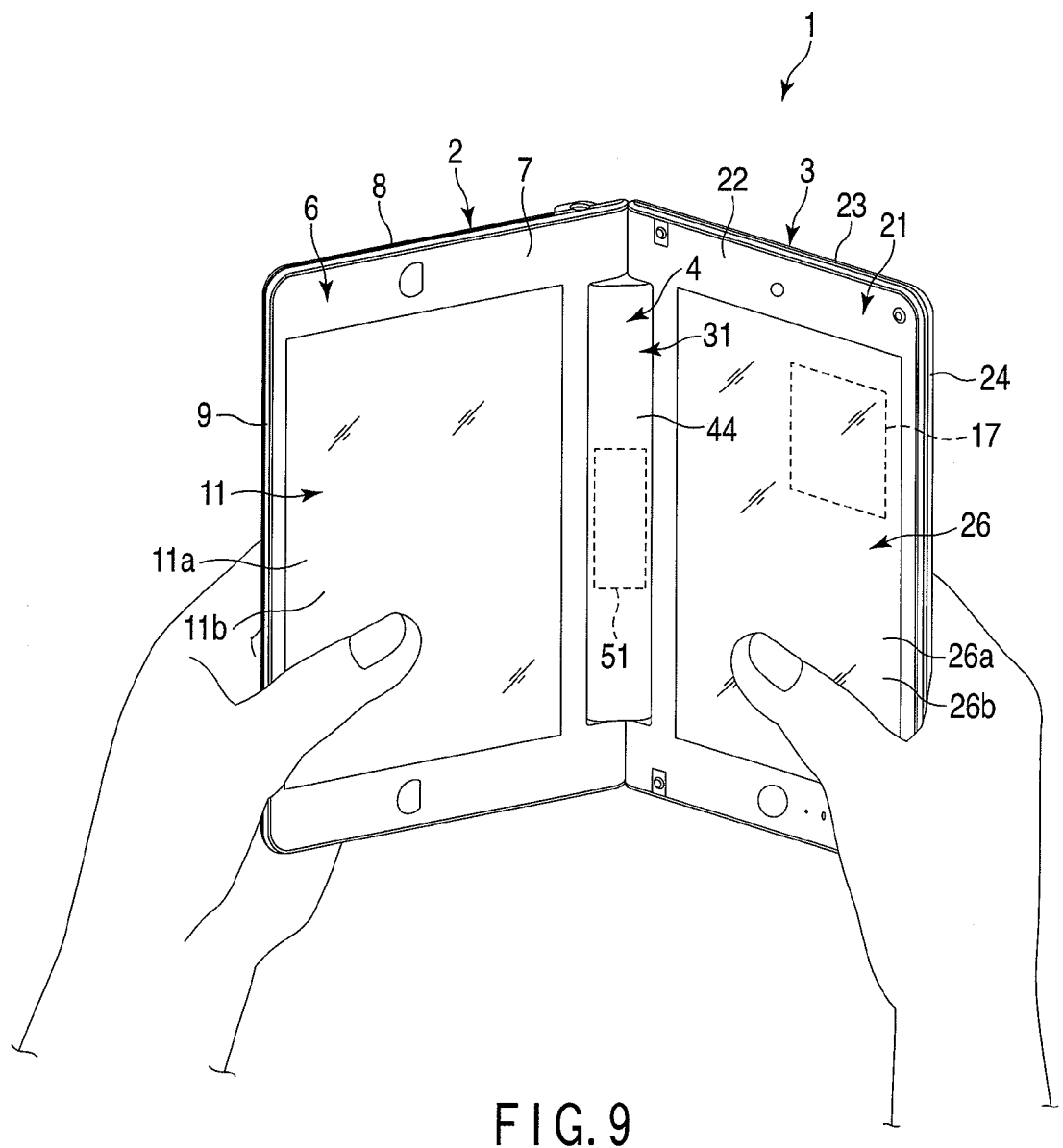
FIG. 9 is an exemplary perspective view illustrating an example of the use pattern of the electronic apparatus shown in FIG. 1.

In the second use pattern, for example, as shown in FIG. 9, the first housing 6 and the second housing 21 are opened in the horizontal direction for use. For example, images rotated at an angle of 90° with respect to that in the first use pattern are displayed on the first display panel 11 and the second display panel 26. In the second use pattern, the electronic apparatus 1 may be used on the desk surface T or may be used with being held by the hands.

According to the electronic apparatus 1 having the above-mentioned structure, it is possible to mount components at high density.

That is, in this embodiment, the electronic apparatus 1 includes the third housing 31 between the first housing 6 and the second housing 21 so as to be rotatably connected to the first housing 6 and the second housing 21. In other words, the third housing 31 is provided for the purpose of connection between the first housing 6 and the second housing 21. A dead space is likely to be formed in the third housing 31, as compared to the first housing 6 and the second hosing 21.

Focusing on the third housing 31, this embodiment effectively uses, for example, the dead space of the third housing 31 to mount the antenna 51 therein. Therefore, it is possible to reduce or save a space for the antenna required to be reserved in the first housing 6 and the second housing 21. In this way, it is possible to mount components at high density in the electronic apparatus 1.

In this embodiment, the first hinge 41 connected to the first housing 6 and the second hinge 42 connected to the second housing 21 are attached to the third housing 31. The third housing 31 having the biaxial hinge mechanism 32 attached thereto has a relatively large inner space. Therefore, a dead space is likely to be formed in the third housing 31. Focusing on the third housing 31, this embodiment effectively uses, for example, the dead space of the third housing 31 to mount the antenna 51. In other words, the use of the third housing 31 allows mounting of a relatively large antenna.

The display panel or the circuit board is likely to be adversely affected by radio waves emitted from the antenna. In addition, the antenna is likely to be adversely affected by unnecessary radiation from the display panel or the circuit board. Therefore, in general, it is necessary to add a radio wave shielding member between the antenna and the above-mentioned units.

However, in this embodiment, since the antenna 51 is in the third housing 31, a relatively long distance (space) can be ensured between the antenna 51 and the display panels 11 and 26 or the circuit board 29. As a result, the necessity of measures to shield radio waves is reduced, thereby allowing a reduced size or omission of the radio wave shielding member. This contributes to the high-density mounting of the electronic apparatus 1.

In particular, in this embodiment, the third housing 31 is forcibly rotated with respect to the first housing 6 and the second housing 21 by the link mechanism 49. As the opening angle of the second housing 21 with respect to the first housing 6 increases, the distance between the antenna 51 and the display panels 11 and 26 or the circuit board 29 increases. Therefore, the antenna 51 is less likely to be affected by unnecessary radiation from the display panels 11 and 26 or the circuit board 29.

The antenna 51 is attached to a wall of the third housing 31 (that is, the third rear wall 45) that rises and faces the outside of the electronic apparatus 1 when the first housing 6 is folded onto the second housing 21. The third rear wall 45 is furthest away from the first display panel 11, the second display panel 26, and the circuit board 29 in the third housing 31. Therefore it is possible to ensure a relatively long distance between the antenna 51 and the display panels 11 and 26 or the circuit board 29c.

In this embodiment, the antenna 51 rises at the first position. According to this structure, it is possible to ensure a relatively long distance between the antenna 51 and the display panels 11 and 26 or the circuit board 29.

In this embodiment, the first housing 6 includes the first front wall 7 with the first opening portion 7a through which the first display panel 11 is exposed and the first rear wall 8 opposite to the first front wall 7. When the second housing 21 is opened at an angle of substantially 180° with respect to the first housing 6, the third rear wall 45 of the third housing 31 is substantially flush with the first rear wall 8 of the first housing 6. According to this structure, is possible to ensure a relatively longer distance between the antenna 51 and the display panels 11 and 26 or the circuit board 29.

In this embodiment, when the second housing 21 is opened at an angle of substantially 180° with respect to the first housing 6, the first housing 6, the second housing 21, and the third housing 31 are substantially horizontal relative to each other. In the electronic apparatus 1, for example, there is no unnecessary convex portion between the first housing 6 and the second housing 21. The electronic apparatus 1 has a good design or a good appearance and high user convenience.

In other words, in order to achieve the development structure, the third housing 31 including the biaxial hinge mechanism 32 is indispensable. Therefore, in this embodiment, the indispensable third housing 31 is used to mount the antenna. That is, for example, a dedicated component for mounting the antenna is not provided.

In this embodiment, the first housing 6 includes a pair of first projections 34a and 34b protruding toward the second housing 21 and the second housing 21 includes a pair of second projections 35a and 35b protruding toward the first housing 6. The third housing 31 is between the pair of first projections 34a and 34b and between the pair of second projections 35a and 35b. According to this structure, it is possible to form the third housing 31 with a relatively large size. The third housing 31 enables mounting of a relatively large antenna.

For example, when the antenna is provided in the housing made of metal, it is necessary to attach an additional cover made of plastic to a region facing the antenna. In this embodiment, the first housing 6 and the second housing 21 are made of metal, and the third housing 31 is made of plastic.

According to this structure, it is not necessary to separately provide the cover made of plastic at the first housing 6 and the second housing 21. Therefore, it is possible to reduce the number of components and improve the outward appearance. Since the display panels 11 and 26 and the circuit board 29 in the first housing 6 and the second housing 21 are shielded by a housing made of metal, the amount of unnecessary radiation decreases.

For example, in the case of a general notebook PC, is considered that the antenna is at the upper end portion of the display unit. The cable of the antenna extends so as to traverse the inside of the display unit and is then connected to the circuit board in the main unit through the hinge. Therefore, the length of the cable increases.

In this embodiment, the cable 52 of the antenna 51 extends from the inside of the third housing 31 to the inside of the second housing 21 and is then connected to the circuit board 29. That is, the cable 52 does not need to extend so as to traverse the first housing 6 or the second housing 21. Therefore, the length of the cable can be reduced. When the length of the cable can be reduced, it is possible to reduce loss in the characteristics of the antenna.

In this embodiment, the electronic apparatus 1 can be switched between the first use pattern in which the first housing 6 and the second housing 21 are opened with respect to each other in the vertical direction for use and the second use pattern in which the first housing 6 and the second housing 21 are opened with respect to each other in the horizontal direction for use. In the second use pattern, as shown in FIG. 9, the third housing 31 including the antenna 51 therein is on the outermost side (the side opposite to the user). That is, the third housing 31 is located in the outside rather than the first housing 6 and the second housing 21. According to this structure, it is possible to improve the sensitivity of the antenna.

As shown in FIG. 8, when the electronic apparatus 1 is used while being held by the hands, the third housing 31 including the antenna 51 therein is one of the portions that are on the outermost side (the side opposite to the user). As described above, under considerations of various use patterns of the electronic apparatus 1, it is possible to dispose the antenna 51 on the outermost side by mounting the antenna 51 in the third housing 31.

Second Embodiment

Next, an electronic apparatus 1 according to a second embodiment will be described with reference to FIG. 10. In the second embodiment, components having the same or similar functions as those of the first embodiment are denoted by the same reference numerals and a description thereof will not be repeated. In addition, structures other than the following structures are the same as those in the first embodiment.

Figure 10:
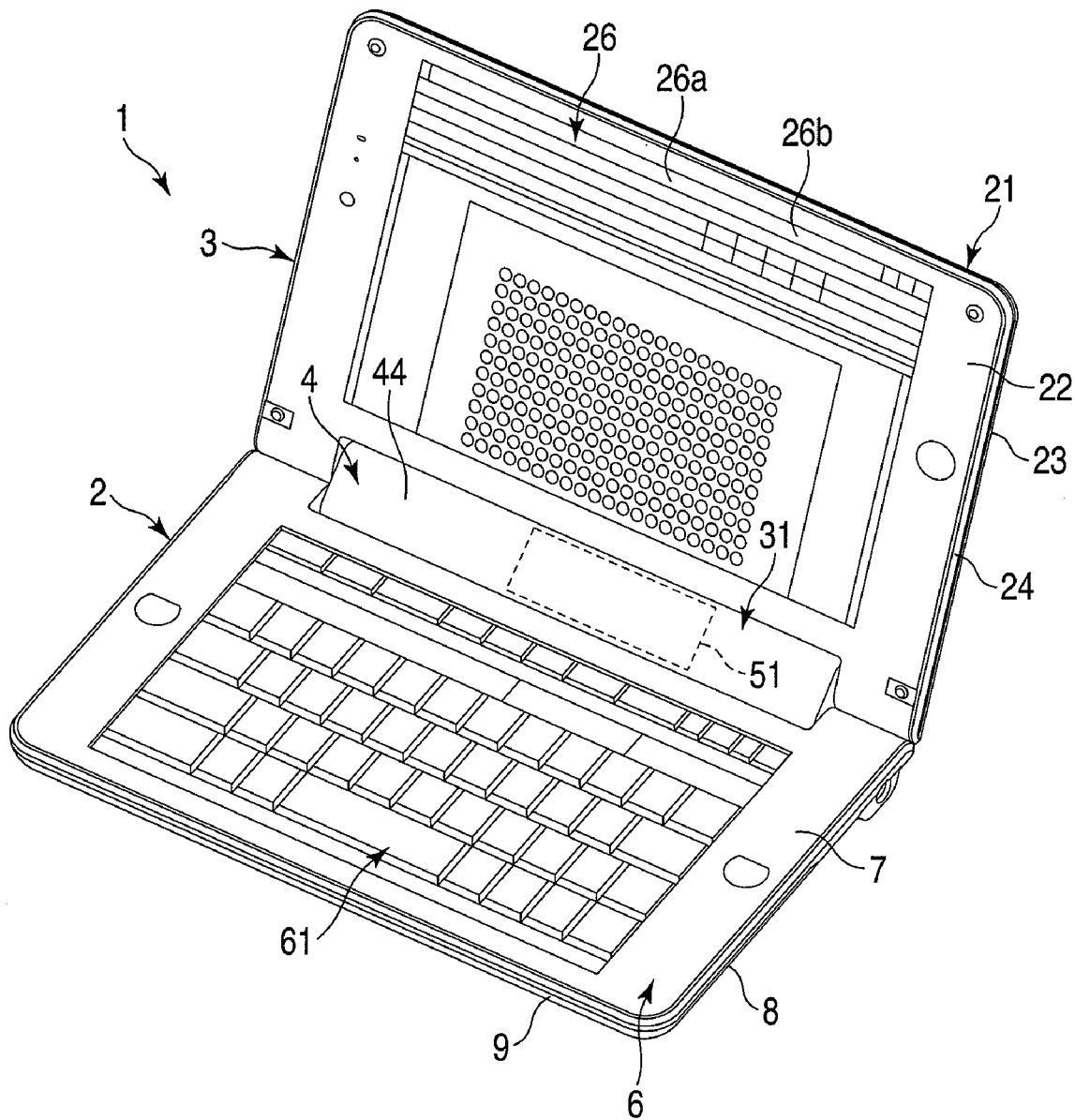
FIG. 10 is an exemplary perspective view illustrating an example of an electronic apparatus according to a second embodiment.

As shown in FIG. 10, a first main portion 2 of the electronic apparatus 1 includes a mechanical keyboard 61, instead of the display panel 11. A circuit board 29 may be in a first housing 6 or a second housing 21. According to this structure, similar to the first embodiment, it is possible to mount components at high density.

The embodiments are not limited to the above-described embodiments, but the components of the above-described embodiments may be changed without departing from the scope and spirit of the invention. In addition, a plurality of components according to the above-described embodiments may be appropriately combined with each other to form various structures. For example, some of the components according to the above-described embodiments may be removed. Components according to different embodiments may be appropriately combined with each other.

For example, the circuit board 29 may be contained in the first housing 6. The first housing 6 and the second housing 21 may be made of plastic. The antenna 51 is not necessarily attached to the third rear wall 45 of the third housing. The antenna 51 may be attached to a different wall of the third housing 31. The ground terminal of the antenna may be connected to the first hinge 41 or the second hinge 42.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first housing comprising a display panel;
a second housing comprising a circuit board;
a third housing between the first housing and the second housing, the third housing comprising a first hinge attached to the first housing and a second hinge attached to the second housing, the third housing configured to connect the first housing and the second housing to rotate between a first position where the first housing faces the second housing and a second position where the first housing is separated from the second housing; and
an antenna in the third housing and attached to a wall of the third housing, wherein the wall rises and faces an outside of the electronic apparatus in the first position,
wherein the antenna is closer to the wall than the first hinge and the second hinge when viewed from a side of the third housing,
wherein the first housing further comprises a first wall with an opening portion through which the display panel is exposed and a second wall opposite to the first wall, and
wherein the wall of the third housing and the second wall of the first housing are substantiall flush with each other when the second housing is opened at an angle of substantially 180° with respect to the first housing.

2. The electronic apparatus of claim 1, wherein the antenna rises substantially parallel to the wall when the first housing faces the second housing.

3. The electronic apparatus of claim 1,
wherein the first hinge and the second hinge are substantially parallel to each other, and
wherein the first housing, the second housing, and the third housing are substantially horizontal relative to each other when the second housing is opened at an angle of substantially 180° with respect to the first housing.

4. The electronic apparatus of claim 1,
wherein the first housing further comprises a pair of first projections protruding toward the second housing,
wherein the second housing further comprises a pair of second projections protruding toward the first housing, and
wherein the third housing is between the first projections and between the second projections.

5. The electronic apparatus of claim 1, wherein the antenna comprises a cable extending from the third housing to the second housing and connected to the circuit board.

6. The electronic apparatus of claim 1, further comprising a controller configured to switch between a first use pattern in which the first housing and the second housing are opened in a vertical direction and a second use pattern in which the first housing and the second housing are opened in a horizontal direction.

7. An electronic apparatus comprising:
a first housing comprising a display panel;
a second housing comprising a circuit board;
a third housing between the first housing and the second housing, the third housing comprising a first hinge attached to the first housing and a second hinge attached to the second housing, the third housing configured to connect the first housing and the second housing to rotate between a first position where the first housing faces the second housing and a second position where the first housing is separated from the second housing; and an antenna in the third housing and attached to a wall of the third housing, wherein the wall rises and faces an outside of the electronic apparatus in the first position, wherein the antenna is closer to the wall than the first hinge and the second hinge when viewed from a side of the third housing, and wherein the second housing further comprises a second display panel.

8. The electronic apparatus of claim 7, wherein the antenna rises substantially parallel to the wall when the first housing faces the second housing.

9. The electronic apparatus of claim 7,
wherein the first hinge and the second hinge are substantially parallel to each other, and
wherein the first housing, the second housing, and the third housing are substantially horizontal relative to each other when the second housing is opened at an angle of substantially 180° with respect to the first housing.

10. The electronic apparatus of claim 7,
wherein the first housing further comprises a pair of first projections protruding toward the second housing,
wherein the second housing further comprises a pair of second projections protruding toward the first housing, and
wherein the third housing is between the first projections and between the second projections.

11. The electronic apparatus of claim 7, wherein the antenna comprises a cable extending from the third housing to the second housing and connected to the circuit board.

12. The electronic apparatus of claim 7, further comprising a controller configured to switch between a first use pattern in which the first housing and the second housing are opened in a vertical direction and a second use pattern in which the first housing and the second housing are opened in a horizontal direction.

13. An electronic apparatus comprising:
a first housing comprising a display panel;
a second housing comprising a circuit board;
a third housing between the first housing and the second housing, the third housing comprising a first hinge attached to the first housing and a second hinge attached to the second housing, the third housing configured to connect the first housing and the second housing to rotate between a first position where the first housing faces the second housing and a second position where the first housing is separated from the second housing; and an antenna in the third housing and attached to a wall of the third housing, wherein the wall rises and faces an outside of the electronic apparatus in the first position, wherein the antenna is closer to the wall than the first hinge and the second hinge when viewed from a side of the third housing, and wherein the first housing is made of metal, and the third housing is made of plastic.

14. The electronic apparatus of claim 13, wherein the antenna rises substantially parallel to the wall when the first housing faces the second housing.

15. The electronic apparatus of claim 13,
wherein the first hinge and the second hinge are substantially parallel to each other, and
wherein the first housing, the second housing, and the third housing are substantially horizontal relative to each other when the second housing is opened at an angle of substantially 180° with respect to the first housing.

16. The electronic apparatus of claim 13,
wherein the first housing further comprises a pair of first projections protruding toward the second housing,
wherein the second housing further comprises a pair of second projections protruding toward the first housing, and
wherein the third housing is between the first projections and between the second projections.

17. The electronic apparatus of claim 13, wherein the antenna comprises a cable extending from the third housing to the second housing and connected to the circuit board.

18. An electronic apparatus comprising:
a first housing;
a second housing;
a third housing between the first housing and the second housing, the third housing comprising a first hinge attached to the first housing and a second hinge attached to the second housing; and
an antenna in the third housing,
wherein the first housing and the second housing are configured to rotate between a first position where the first housing faces the second housing and a second position where the first housing is separated from the second housing,
wherein the antenna is attached to a wall of the third housing, the wall extending in a direction in which the first housing faces the second housing, and
wherein the antenna is closer to the wall than the first hinge and the second hinge irrespective of positions of the first housing and the second housing,
wherein the first housing further comprises a first wall with an opening portion through which the display panel is exposed and a second wall opposite to the first wall, and
wherein the wall of the third housing and the second wall of the first housing are substantially flush with each other when the second housing is opened at an angle of substantially 180° with respect to the first housing.

19. An electronic apparatus comprising:
a first housing;
a second housing;
a third housing between the first housing and the second housing, the third housing comprising a first hinge attached to the first housing and a second hinge attached to the second housing; and
an antenna in the third housing,
wherein the first housing and the second housing are configured to rotate between a first position where the first housing faces the second housing and a second position where the first housing is separated from the second housing,
wherein the antenna is attached to a wall of the third housing, the wall extending in a direction in which the first housing faces the second housing,
wherein the antenna is closer to the wall than the first hinge and the second hinge irrespective of positions of the first housing and the second housing, and
wherein the second housing further comprises a second display panel.

20. An electronic apparatus comprising:
a first housing;
a second housing;
a third housing between the first housing and the second housing, the third housing comprising a first hinge attached to the first housing and a second hinge attached to the second housing; and an antenna in the third housing, wherein the first housing and the second housing are configured to rotate between a first position where the first housing faces the second housing and a second position where the first housing is separated from the second housing, wherein the antenna is attached to a wall of the third housing, the wall extending in a direction in which the first housing faces the second housing, wherein the antenna is closer to the wall than the first hinge and the second hinge irrespective of positions of the first housing and the second housing, and wherein the first housing is made of metal, and the third housing is made of plastic.

* * * * *